Oct. 29, 1957  J. W. BLACKMAN ET AL  2,811,040
METHOD OF MARKING INSTRUMENTS AND RESULTANT ARTICLE
Filed April 16, 1952
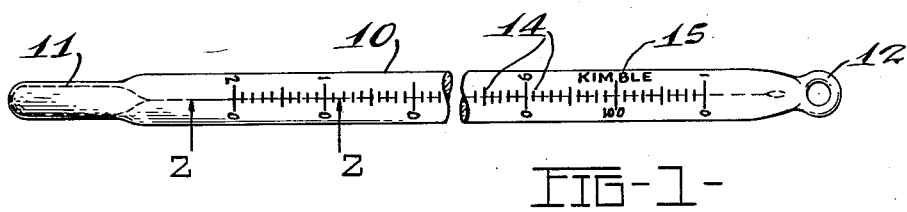
FIG-1-
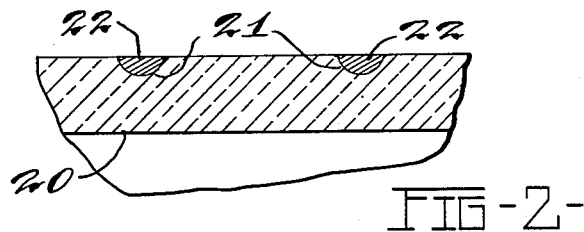
FIG-2-
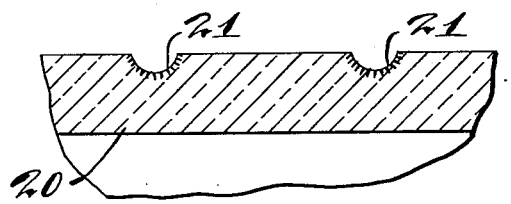
FIG-3-
INVENTOR.
JOHN W. BLACKMAN
DUDLEY C. SMITH
BY
ATTYS United States Patent Office 2,811,040
Patented Oct. 29, 1957

2,811,040

METHOD OF MARKING INSTRUMENTS AND RESULTANT ARTICLE

John W. Blackman, Pitman, and Dudley C. Smith, Vineland, N. J.

Application April 16, 1952, Serial No. 282,638

5 Claims. (Cl. 73—371)

This invention relates to thermometers and their production and in particular, to thermometers for use under temperature conditions or in contact with liquids either of which may be capable of effecting the removal of the indicia markings from the thermometers.

Such thermometers are made of glass of various compositions, but mainly from so-called lead (PbO) and borosilicate glass compositions.

These thermometers are provided with visible graduations or indicia markings both for temperature measurements and for identification. Such indicia usually comprise precision located graduations and numerals extending over the length of thermometer and visible on the outer surface thereof. Such indicia are desirably opaque for facility in reading. The thermometers may be graduated to indicate either Fahrenheit or centigrade temperature readings and the thermometer scale may extend over various temperature ranges, as for example, —30 to +120° F., —10 to +360° F., etc. or the graduations or markings may be for other useful purposes. It is desirable however that all such markings be easily and permanently legible.

The method hereinafter disclosed for applying such indicia or identification markings may also be utilized in preparing other glass articles from various types of glass and for like or similar purposes.

The opaque graduations or indicia on the thermometer, and the application of identifying indicia, requires specific techniques due to the nature of the instrument or thermometer and the precision required. In this present method of marking, the thermometer tube is first coated externally with wax, the desired markings or indicia are then engraved through the wax only, and the then unprotected engravings are etched into the glass with the usual or well known hydrofluoric acid solutions used for such purposes. The remaining wax is then removed, the etched graduations filled with metallic salt or other composition capable of producing a permanent stain or coloration within the surface of the glass. The thermometer is then subjected to a temperature capable of causing the stain to penetrate the etched glass surface to become a permanent part thereof, without adversely affecting the strength, tempering or annealing of the glass, while increasing the visibility of such indicia.

This penetration of the stain into the glass may leave in the etched marks or indicia, a residue resulting from the non-reactive or inert portion of the staining composition. This residue is subsequently washed out with a non-etching acid solution leaving the etched markings at approximately their original depth but with their surfaces penetrated by the stain to render them opaque and of increased visibility.

Thus, such markings, color films or indicia are indented below the normal exposed outer surface level of the instrument and are therefore difficult to reach, thus making such marking difficult to remove by scratching or chipping. Actually any action taken to remove these stained or colored portions may result in breakage, because of the excessive weakening of the wall structure of the instrument that would be required, such as further etching or grinding the markings to an extreme depth.

Therefore, it is an object of the present invention to produce a thermometer having certain advantages over those heretofore produced by providing an improved marking or indicia, etc.

Another object is to provide an improved method of marking the exposed surface areas of thermometers, similar instruments or other glass articles.

A further object is to provide an improved thermometer or other articles of glass with markings or colored indicia wherein the color penetrates below the exterior surfaces of the area of the glass to which they are applied and which are permanent and which do not cause weakening or embrittlement of the glass base.

These and other objects will be apparent from the following description and the accompanying drawings.

In the drawings:

Fig. 1 is a substantially enlarged elevational view of a thermometer embodying the invention;

Fig. 2 is a greatly enlarged section of the thermometer tube wall, taken on the line 2—2 of Fig. 1, showing the etched markings filled with unfired indicia material; and Fig. 3 is the same enlarged section as in Fig. 2, but subsequent to the staining or firing operation showing the penetration of the stain into the surface of the etched portions.

Referring to the drawings, the invention is shown as applied to a thermometer tube 10 having a mercury bulb 11 formed on one end thereof and with a ring 12 at its opposite end. Graduations or temperature measuring indicia marks 14 are provided along one side of the thermometer tube 10 with said markings coordinated with the upper surface of the mercury or other fluid in the tube 10 for accurate temperature measurement. In the present drawings the graduations or indicia 14 are shown as indicative of thermometer temperature readings, but it is not intended that this present invention be limited to these examples.

In addition to the temperature graduations, the thermometer may carry other markings, such as the name of the manufacturer 15, contents, etc. Graduation indicia 14 and identification indicia 15 of the penetrating or under-surface type constitute the novelty of the present invention. These indicia are an integral part of the glass wall 20 of the thermometer tube 10, in that they have permeated the wall per se, giving an appearance of a thin film coating which may not be removed without removing portions of the permeated wall 20.

The staining of these indicia is the preferable form of procedure in this present invention, for several reasons, the most prominent among these being (a) the stain enters into, permeates and becomes an integral part of the glass body; (b) the firing temperature of the stain is below the deformation temperature of the glass bodies upon which it may be used and usually below the annealing temperatures of these glasses (c) the addition of this stain to the glass body is not conducive to a weakening or embrittlement thereof.

Ceramic coatings, frits or enamels heretofore utilized for the purpose of marking glass articles have also been proposed for use in filling or marking the graduations etched on thermometers, (Greene Patent No. 2,220,096). However, such ceramic colors or enamels have characteristics quite different from those listed above for the stains. After firing, ceramic enamel forms an added surface layer of vitrified material securely bonded to the glass but having a thermal contraction greater than that of any thermometer glass. As a result, when the combination of ceramic enamel and glass is cooled from the effective solidification temperature of the enamel to room temperature, stress develops between the enamel and the glass. These stresses weaken the thermometers and render it susceptible to breakage by mechanical or thermal shocks which a normal thermometer would be expected to withstand. By contrast, the coloration produced by ionic stains is completely non-weakening, and has no deleterious effect on the thermometer.

The staining material used in this present invention is comprised of a mixture of oxides and salts of copper, silver, iron, chromium and other elements in various combinations, a catalytic agent, an inert filler such as iron oxide, clay, Bentonite, etc., and an added vehicle or carrier agent, for example, beeswax and a suitable solvent such as varsol, in such proportions as to form a paste. Inert fillers serve merely as diluents.

The composition of the stain does not form a part of this invention and therefore the proportions of the mixture are not here given. This stain is highly resistant to solvents, oils, acids and other media encountered by thermometers in normal usage. High temperatures do not affect the stain.

As illustrated more particularly in the enlarged sections of Figs. 2 and 3, the indicia etchings 21, for example, are shown as having been etched beneath the outer surface area of the tube wall 20 so that the surface portions of these indicia will always be below the outer surface area of the wall 20 and consequently inaccessible to easy scratching or removal.

In Figs. 2 and 3 the indicia 14 as shown, is etched below the outer surface of the tube 10 and this depth of etching may be of the order of from .02 to .15 mm., with an average depth of .07 mm., thus always keeping the ultimate stained surface area below the outer wall surface areas of the tube, thus providing an under-surface marking.

The etchings 21 are shown in Fig. 2 as filled with the stain paste or indicia material 22 and with the outer surface areas of the tube 10 cleaned of any wax or residual stain paste.

This stain which is received in powder form is mixed with wax or other binder and a solvent in such proportions as to provide a sticky or tacky paste 22 which will adhere to the etched indicia grooves 21. The staining paste or indicia material 22 is wiped, rubbed, brushed, or painted into the grooves 21 or may be entered thereinto by any other means. After the grooves 21 are filled, any excess paste on the outer surface areas of the tube is wiped off and the tube is then ready for firing.

After the indicia marks 14 have been filled with the stain paste, the thermometer is then vertically positioned in a holder (not shown), with the mercury bulb portion 11 downward, which permits the mercury bulb portion 11 only to be subjected to a coolant, the temperature of which is substantially below that of the low reading of the thermometer, for example, approximately 90° F. below zero, thus keeping the mercury in the bulb portion 11 of the thermometer body, while the tube or stem portion of the thermometer, containing the indicia, is being subjected to a firing or staining temperature.

A series of these marked thermometers are vertically positioned in a movable chuck, (not shown) with the mercury bulb 11 surrounded by the coolant and the stem portion of the thermometer extending vertically upward therefrom and arranged for projection into an oven. Said oven is heated to a firing or staining temperature above 343° C. but not in excess of 750° C. within which range any of the usual type of glass composition may be heated to thereby cause the stain or indicia material to permeate the glass base.

A mechanism which may be utilized for carrying out this method is illustrated in the patent to Greene—2,220,096, November 5, 1940, said patent presently owned by the assignee of this present application.

In case the thermometer tubes 10 are made of the common type of lead glass the firing temperatures should be somewhere between 343° C. and 455° C. (650° F. to 850° F.), depending on the time of firing and other factors, but in no event should the temperature be high enough to cause bending or deformation of the glass. Thermometer tube is commonly made of two glasses, a clear glass comprising the bulk of the tube, together with an opaque layer embedded in the clear portion. The opaque layer aids the observation of the mercury or other temperature indicating fluid, but has the following disadvantage. The glass comprising the opaque layer is of a different composition than the clear portion and the expansion-contraction characteristics of the two are rarely if ever, perfectly matched. As a result, thermometer glasses are somewhat prone to deflect or bend at temperatures near the annealing range. It is therefore a distinct advantage to be able to produce a permanent coloration of the glass at the relatively low temperatures at which the above described are operable. If the thermometer tube is made of another common type of thermometer glass, namely borosilicate glass, then higher firing or staining temperatures are permissible and desirable. With this latter type of glass the firing or staining temperature should be in the approximate range of 427° C. to 593° C. (800 to 1100° F.). Depending upon the particular glass from which the tube 10 is formed, the temperature for firing the stain will vary. With any given glass, temperature and time are to some extent complementary, since, in general, the higher the temperature the shorter the time required to produce any given degree of coloration. For example, with a lead thermometer glass containing approximately 22% of lead oxide (PbO) and with an annealing point of 460° C. (860° F.) a firing period of from 10 to 15 minutes at 440° C. will be required, depending upon the composition of the staining compound and the depth of color desired. With borosilicate thermometer glass of the usual type, a period of from 7 to 13 minutes at 540° C. will be required to stain the etched areas. In any event the firing temperature will always be below the deformation point of the base upon which the markings will be placed.

Depending upon the particular glass from which the tube 10 is formed the temperature for firing the stain will vary and with such variation, the time period of firing will also vary. For example, with a lead glass containing approximately 22% of lead (PbO), an annealing point of approximately 460° C. (860° F.), a time period of from approximately ten to fifteen minutes at a temperature of approximately 440° C., will be required, depending upon the effect upon the firing temperature as a result of inserting comparatively cold thermometers into the heat zone. In the case of a borosilicate thermometer glass, a period of time from approximately seven to thirteen minutes, at a temperature of approximately 540° C. (1004° F.) will be required to stain the etched surface areas.

The subjection of the paste or indicia material to the above temperatures causes a staining, the method or theory of which, as we believe it occurs, results in the constituent ions of the copper and silver of the staining material, in effect, to enter the glass to thereby become a permanent and integral part of the glass structure, so that any subsequent removal of color therefrom can be accomplished only by eroding or dissolving some of the glass itself.

From the standpoint of permanence metallic stains are greatly superior to any material previously used for this purpose and unlike the previously used material, these stains are completely resistant to solvents, oils and other organic media at all operative temperatures. The stains are also completely resistant to common acids, such as hydrochloric, nitric, and sulphuric acids, regardless of concentration or temperatures. In general such stains are completely resistant to any chemical or corrosive medium which does not severely attack the glass itself.

Thermometers as manufactured, previous to this present invention, do not possess such permanent graduations or markings. The lines and numbers comprising the graduations are marked by means of paints, enamels or pigmented cements, all of which are materials readily removed by the action of solvents, acids or other corrosive media with which the thermometers come in contact in service. The usefulness of the thermometer is thus impaired and this is a weakness common to all thermometers hitherto manufactured.

As stated above ceramic enamels have been proposed for use in thermometer graduations, but while such materials are superior to the conventional coloring materials applied to thermometer graduations, usually temperatures in excess of 950° F. are required to affix them to the glass surface and the affixing of such materials to the thermometer results in weakening and embrittlement of the thermometer at every point where the ceramic enamel is applied. The weakening results from differences in contraction between the ceramic enamel and the base glass. As a consequence, the serviceability of the thermometer is seriously impaired. By contrast, coloration by staining causes no weakening of the thermometer and furthermore, such coloration is much more resistant to removal by acids and other chemicals than are ceramic enamels, or any other type of coloration previously employed.

From the preceding it should be quite apparent that with thermometers made from different base glass compositions, that different annealing and deformation temperatures will be encountered and therefore the maximum firing temperature possible of use will be correspondingly variable. Also the time interval required for staining will be affected by changes in the composition of the glass and the stain and the proposed method will vary in these basic respects only.

Consequently it is contemplated that the firing temperatures will vary for flint, lead, borosilicate and high-aluminum glasses and that the firing temperature and firing interval will vary accordingly.

From the drawings and the preceding descriptive matter it should be apparent that the end result of this method is that the etched indicia retains its etched contour, beneath the outer wall surface areas of the instrument and that this etched contour is stained with a penetrating fired stain and becomes a permanent part of the wall of the thermometer.

The term "mercury" as used in this specification is contemplated to refer to any expansive fluid used within a thermometer to indicate measurements of heat or cold.

Variations may be resorted to within the spirit and scope of the appended claims.

We claim:

1. A glass thermometer comprising an elongated tubular body having a bulb at one end thereof and a passage extending longitudinally of said body and communicating with said bulb whereby a thermally responsive material may extend from said bulb into said passage, said body also having a clear glass smooth outer surface portion marked by a plurality of etched temperature indicating markings spaced apart longitudinally of the body, each marking extending across and in front of said passage and having a viewable etched surface extending inwardly from and located below the clear glass smooth outer surface of the tubular body, said etched surface being penetrated by a colored ionic stain which does not weaken the tubular body to any appreciable extent, which does not alter the etched character of the surface penetrated thereby, and which has a permanency comparable to the permanency of the surface penetrated thereby whereby each marking is a substantially integral part of the thermometer and may not be removed without removing the etched surface of the marking.

2. The method of marking a clear glass smooth outer surface portion of an elongated glass thermometer having a thermally responsive material receiving passage extending longitudinally thereof beneath said clear glass outer surface portion and viewable therethrough, said method comprising the steps of etching a plurality of indicia markings into and beneath the smooth outer surface of said clear glass outer surface portion to a predetermined depth, said markings being spaced apart longitudinally of the thermometer and each marking extending across and in front of said thermally responsive material receiving passage, filling each marking with an ionic stain producing material capable of reacting with the etched glass of the marking in response to applied heat to cause an ionic stain to penetrate the etched surface of each marking and become substantially permanent therewith whereby the stain may not be removed without destroying the etched character of the marking, the filling of the markings being confined to the markings to avoid discoloring the clear glass smooth outer surface adjacent to the markings, then heating the applied ionic stain producing material and the portions of the thermometer adjacent thereto to cause said material to react with the etched glass of each marking, said heating being continued for a period of time not in excess of approximately 15 minutes, and then removing any ionic stain producing material residue from each marking to expose the etched surface of the marking, the ionic stain which has penetrated the etched surface having a color contrasting distinctly with the clear glass outer surface portion of the thermometer to provide a sharp and readily readable marking.

3. The method according to claim 2 wherein the thermometer is a lead glass base temperature sealed thermometer, the ionic stain producing material is a paste containing metallic salts and oxides, and the heating is carried out at a temperature in the range of from approximately 435° C. to approximately 455° C.

4. The method according to claim 2 wherein the thermometer is a borosilicate glass base sealed thermometer, the ionic stain producing material is a paste containing metallic salts and oxides, and the heating is carried out at a temperature in the range of from approximately 520° C. to approximately 550° C.

5. The method according to claim 2 wherein the thermometer has a bulb at one end thereof communicating with the thermally responsive material receiving passage and the bulb is cooled during heating of the ionic stain producing material to retain thermally responsive material in said bulb during said heating.

References Cited in the file of this patent

UNITED STATES PATENTS

| | | |
|---|---|---|
| 1,592,429 | Kraus | July 13, 1926 |
| 1,862,366 | Boyer | June 7, 1932 |
| 1,996,549 | McNutt | Apr. 2, 1935 |
| 2,220,096 | Greene | Nov. 5, 1940 |
| 2,330,193 | Blaw | Sept. 28, 1943 |
| 2,498,003 | Peterson | Feb. 21, 1950 |
| 2,505,411 | Kolodny et al. | Apr. 25, 1950 |
| 2,699,670 | Becton | Jan. 18, 1955 |